(12) United States Patent
Hübler

(10) Patent No.: US 7,664,105 B2
(45) Date of Patent: Feb. 16, 2010

(54) METHOD AND APPARATUS FOR STORAGE OR RELOCATION OF DEFINED POSITIONS IN A DATA STREAM

(75) Inventor: Friedemann Hübler, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 823 days.

(21) Appl. No.: 10/988,803

(22) Filed: Nov. 15, 2004

(65) Prior Publication Data
US 2005/0122974 A1 Jun. 9, 2005

(30) Foreign Application Priority Data
Nov. 25, 2003 (DE) ................. 103 55 345

(51) Int. Cl.
*H04L 12/56* (2006.01)
(52) U.S. Cl. .................. 370/389; 370/395.64
(58) Field of Classification Search ............ 370/395.4, 370/395.43, 395.41, 310, 338, 235, 310.1, 370/389, 382, 392, 390, 241
See application file for complete search history.

(56) References Cited

U.S. PATENT DOCUMENTS

| | | | | |
|---|---|---|---|---|
| 6,219,043 B1 * | 4/2001 | Yogeshwar et al. | ............ | 341/55 |
| 6,278,838 B1 * | 8/2001 | Mendenhall et al. | ......... | 386/125 |
| 6,633,564 B1 * | 10/2003 | Steer et al. | .................. | 370/389 |
| 6,654,389 B1 * | 11/2003 | Brunheroto et al. | ......... | 370/535 |
| 6,738,634 B1 * | 5/2004 | Shin | ........................... | 455/466 |
| 6,754,210 B1 * | 6/2004 | Ofek | .......................... | 370/389 |
| 6,845,100 B1 * | 1/2005 | Rinne | .................... | 370/395.43 |
| 6,948,185 B1 * | 9/2005 | Chapel et al. | ................ | 725/139 |
| 7,012,902 B2 * | 3/2006 | Omi et al. | ................. | 370/310.1 |
| 7,031,294 B2 * | 4/2006 | Aiello et al. | ................. | 370/348 |
| 7,089,485 B2 * | 8/2006 | Azadet et al. | ............... | 714/798 |
| 2001/0013068 A1 * | 8/2001 | Klemets et al. | ............. | 709/231 |
| 2001/0026561 A1 | 10/2001 | Morris et al. | | |
| 2002/0018643 A1 | 2/2002 | Okada et al. | | |

(Continued)

FOREIGN PATENT DOCUMENTS

EP 1 051 027 A1 5/2000

(Continued)

OTHER PUBLICATIONS

A. Nafaa, et al., "RTP4mux: a novel MPEG-4 RTP payload for multicast video communications over wireless IP" in Proc. PV 2003, 13th International Packet Video Workshop, Nantes, France, Apr. 2003.*

(Continued)

*Primary Examiner*—Salman Ahmed
(74) *Attorney, Agent, or Firm*—Robert D. Shedd; Paul P. Kiel; Guy H. Eriksen

(57) ABSTRACT

In packet-oriented data streams, structural information which is needed, for example, for searching or for forwarding or reversing is contained only in specific packets. According to the invention, while a data stream is being stored, an information file is produced which contains references to the starts of all those packets which contain this information. The information file contains data blocks, and each data block identifies the position of a data packet with structural information, as well as the distance to the next or previous such data packet, and additional information relating to the respective data packet.

16 Claims, 2 Drawing Sheets

U.S. PATENT DOCUMENTS

Figure 1:
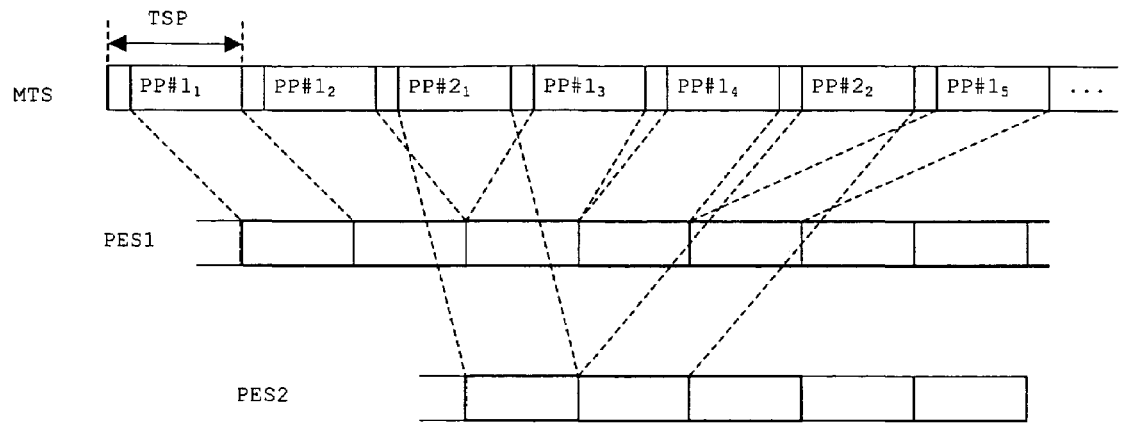

| | | | | |
|---|---|---|---|---|
| 2002/0041628 A1* | 4/2002 | Andersson et al. | ..... | 375/240.12 |
| 2002/0071413 A1* | 6/2002 | Choi | ..... | 370/337 |
| 2002/0154647 A1* | 10/2002 | Potash | ..... | 370/412 |
| 2002/0168174 A1* | 11/2002 | Ito | ..... | 386/65 |
| 2003/0026265 A1* | 2/2003 | Brouwer et al. | ..... | 370/395.42 |
| 2003/0147399 A1* | 8/2003 | Burns | ..... | 370/395.4 |
| 2004/0114908 A1* | 6/2004 | Ito | ..... | 386/95 |
| 2004/0196850 A1* | 10/2004 | Ho | ..... | 370/395.4 |
| 2004/0218633 A1* | 11/2004 | Burzynski | ..... | 370/474 |
| 2005/0031308 A1* | 2/2005 | Fu et al. | ..... | 386/94 |
| 2005/0117888 A1* | 6/2005 | Suzuki | ..... | 386/95 |
| 2005/0122974 A1* | 6/2005 | Hubler | ..... | 370/389 |
| 2007/0092241 A1* | 4/2007 | Kikuchi et al. | ..... | 396/95 |
| 2007/0147429 A1* | 6/2007 | Shi et al. | ..... | 370/473 |
| 2008/0165808 A1* | 7/2008 | Russell et al. | ..... | 370/505 |

FOREIGN PATENT DOCUMENTS

| | | | |
|---|---|---|---|
| EP | 1089565 A2 | 4/2001 | |
| EP | 1 363 291 A1 | 1/2002 | |
| EP | 1187134 A2 | 3/2002 | |
| EP | 1 294 139 A2 | 8/2002 | |
| EP | 1536429 A1 * | 6/2005 | |

OTHER PUBLICATIONS

Testing Multimedia Transmission Systems; Source IEEE Design & Test archive vol. 12 , Issue 4 (Dec. 1995) table of contents pp. 34-44 Year of Publication: 1995 ISSN:0740-7475 Author David K. Fibush.*

Transmission of MPEG-2 video streams over ATM; Gringeri, S. Khasnabish, B. Lewis, A. Shuaib, K. Egorov, R. Basch, B. GTE Labs. Inc., Waltham, MA; This paper appears in: Multimedia, IEEE; Publication Date: Jan.-Mar. 1998; vol. 5, Issue: 1 On pp. 58-71.*

The Design and Implementation of a Real-time Multimedia Synchronization Control System; L Li - 1995.*

* cited by examiner

METHOD AND APPARATUS FOR STORAGE OR RELOCATION OF DEFINED POSITIONS IN A DATA STREAM

This application claims the benefit, under 35 U.S.C. 119, of European Patent Application No. 10355345.2 filed Nov. 25, 2003.

BACKGROUND

Digital data streams, for example based on the MPEG2 Standard ISO/IEC 13818-1, are often broken down into packets. In this case, certain information items, such as time details, are contained only in specific packets. In particular, the cited standard defines the structure of a transport data stream (TS). An MPEG2-TS data stream is a packet-oriented stream which comprises successive transport packets ("Transport Stream Packets", TSP). A TSP comprises a header and transport data, which in turn represent a part of a packet (PES packet) of a packet-oriented elementary data stream (Packetized Elementary Stream, PES). In order to obtain an entire PES packet, the individual parts must be extracted from successive associated TSPs and must be assembled without in the process changing the sequence of the TSPs. A PES packet comprises header information and a data field. The data field may, for example, be a part of a video data stream or of an audio data stream. In order to search through (scan) a data stream such as this for information, each packet must be investigated, which takes a long time. Furthermore, extensive evaluation processes may be required, for example error checking or error correction.

SUMMARY OF THE INVENTION

In order to avoid having to investigate each data packet in a packet-oriented data stream, an information file (info file) is produced, which is helpful during scanning of the data stream. In this file, the respective offsets of distinctive information items are stored, that is to say the offset in packets and bytes. The data stream and the information file are scanned in parallel, that is to say at the same time, and the information file is used to identify how many packets or bytes in the data stream can be skipped in order to reach the next specified position with the desired information, or the next marked entry point. Moreover, further information items relating to the respective data packet may be stored in the information file, which information items have to be evaluated from the data stream using more extensive procedures. In consequence, these procedures need be carried out only once. This may be done in the studio itself or in the user's recorder, during the recording process or subsequently during post-processing. For this purpose, it is in principle sufficient for the appliance to be able to record the information file and just to be able to play back the recorded data stream. An information file according to the invention allows the data stream to be scanned with virtually no delay, thus achieving an enormous time advantage for information extraction and for jumping to a specific position in the data stream.

An information file according to the invention for scanning packet-oriented data streams comprises a sequence of information blocks. Each information block is associated with a dedicated packet in the data stream, and contains two components: firstly the offset, that is to say the number of packets or bytes after which the next data packet associated with the next information block occurs, and secondly additional information relating to the currently associated data packet, for example the respective timestamp.

In order to allow an information file also to support variable data rates and different packet sizes better, the information block contains the offset to the next relevant packet, both in packets and in bytes. One of the two details would in this case in principle be sufficient.

Furthermore, the offsets are relative, so that an information file according to the invention can support data streams of any size. In contrast to absolute offsets, which relate to the start of the stream, the limitation resulting from the offset size relates only to the distance between two data packets, but not to the file length.

The information file may, in particular, be utilized for fast forwarding and reversing in packet-oriented data streams, where it allows increased flexibility. The use of an information file results in packet-oriented data streams being scanned considerably more quickly, since packets of no interest and irrelevant packets in the data stream can be skipped, in particular those packets in the transport data stream which are part of different elementary data streams or which do not contain PES packet headers. Furthermore, the results of complicated calculations may be stored as additional information in the information file, so that the calculations need be carried out only once, for example on creation of the information file. The use of an information file becomes more effective the greater the number of packets which are skipped in the data stream, and the more difficult the process of extraction of the desired information items from the data stream.

An apparatus for forwarding or reversing within an elementary data stream which comprises data packets of different size, with these data packets being extracted from other, constant size data packets in a transport data stream, for example TDPs, and with a file pointer indicating a current position within the transport data stream, contains at least one storage medium, from which the position of those TDPs in the transport data stream which contain the starts or headers of the data packets in the elementary data stream is retrieved, as well as a means, for example a processor, for calculation of the position of another TSP within the transport data stream, from the position of the file pointer and from the position details or offset, which have been retrieved from the storage medium, for the other TDP, and, finally, a means for setting the file pointer to the calculated position within the transport data stream.

Advantageous embodiments of the invention are described in the claims, in the following detailed description and in the drawings.

DRAWINGS

Figure 2:
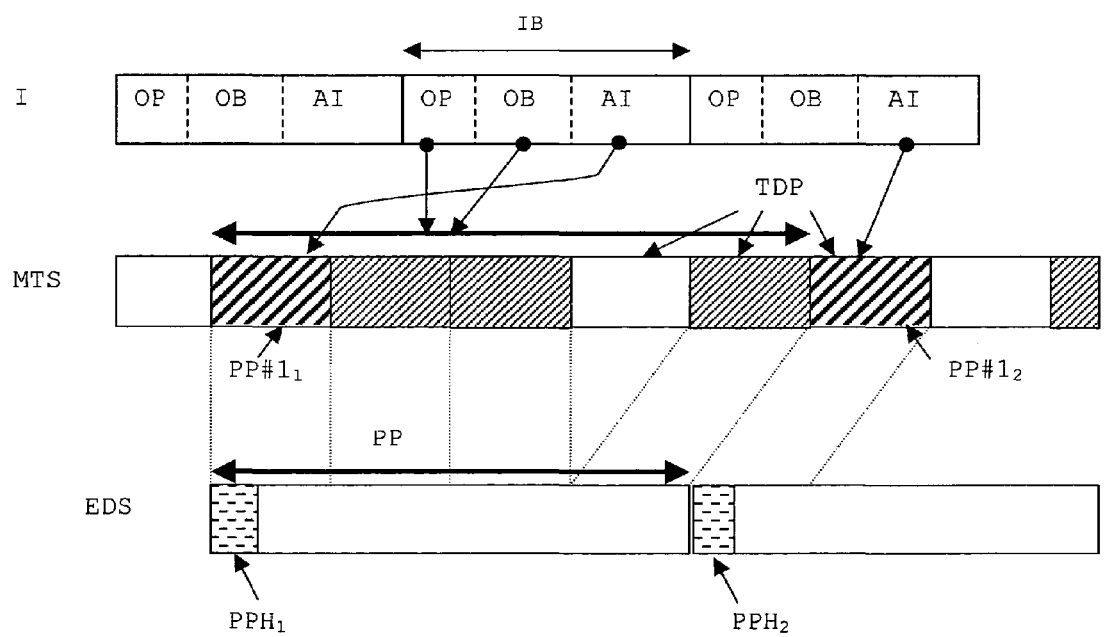
Figure 3:
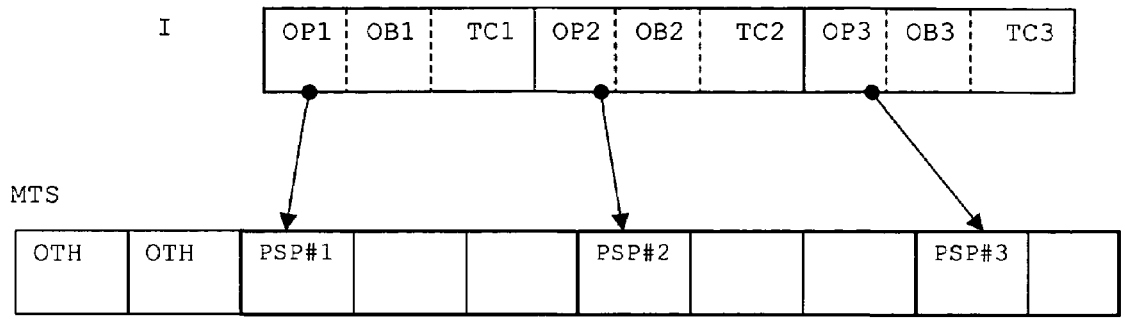
Figure 4:
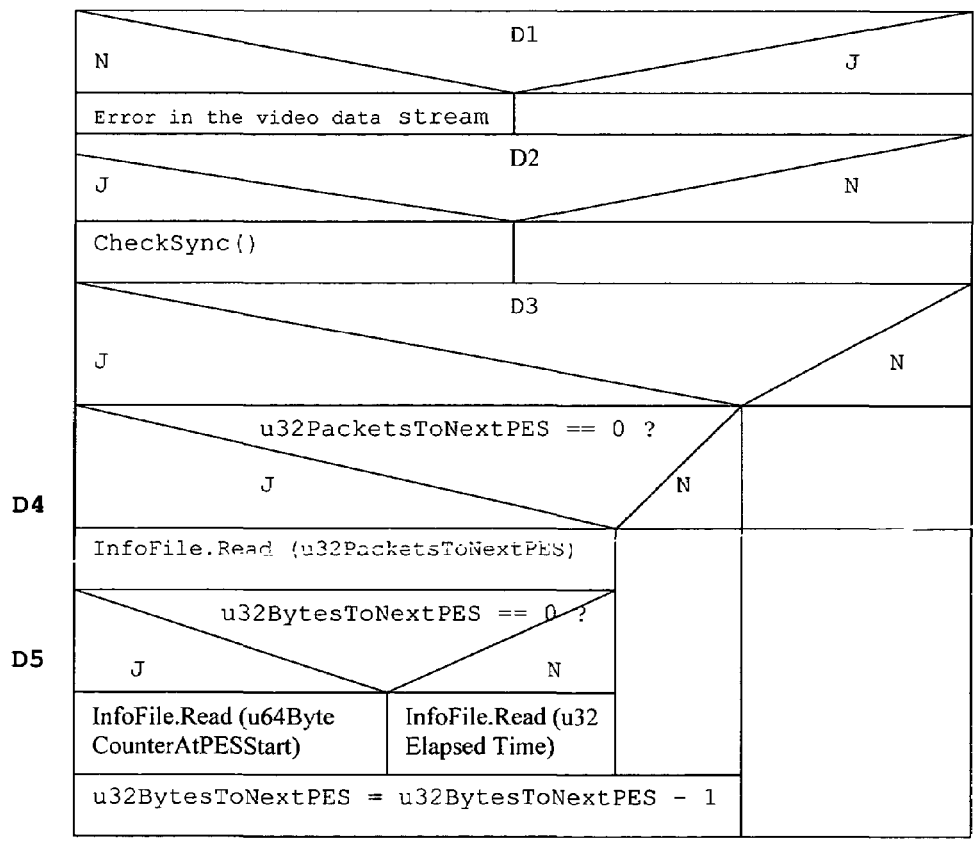

Exemplary embodiments of the invention are sketched in the drawings, which are described in the following text and in which:

FIG. 1 shows the layout of an MPEG-2 TS data stream;
FIG. 2 shows the general layout of an information file;
FIG. 3 shows an information file for an MPEG-2 TS data stream; and
FIG. 4 shows a structogram of the ParsePacket( ) function.

EXEMPLARY EMBODIMENTS

The invention will be explained using the example of a parser for an MPEG-2 storage and replay apparatus (digital storage device, DSD), which is referred to in the following text as a DSD-MPEG2 parser.

The DSD-MPEG2 parser investigates a stream of MPEG-2 TS data, comprising TSPs, and attempts to assemble complete PES packets from the parts of PES packets contained in this stream. The TSPs may belong to different PES packets, resulting in different elementary data streams. A simplified MPEG-2 transport data stream MTS and associated elementary data streams PES1, PES2 are illustrated schematically in FIG. 1. The transport data stream MTS comprises MPEG-2 transport packets TSP, which each contain headers and data, or payload. This payload represents parts of PES packets, which in turn comprise headers and data, or payload. The associated PES packets PP#1, PP#2 result in elementary data streams PES1, PES2, with one of which may, for example, contain video data, and the other audio data.

The "start_code_prefix" in the header of a PES packet has a length of 24 bits and has the fixed value $000001_{hex}$. The subsequent "stream_id" indicates the type of data stream ("PES_packet_data_byte") being carried. This is in the range from $E0_{hex}$ to $EF_{hex}$ in a video stream, and in the range from $C0_{hex}$ to $DF_{hex}$ in an audio stream.

The parser investigates the "payload_unit_start_indicator" flag from the header from the TSP for the value 1, and the data area of a TSP such as this for the value $00000001_{hex}$, corresponding to the "start_code_prefix" of the PES packet, expanded to 32 bits. If both fields have the expected values, then the parser decides that a new PES packet starts in the current TSP.

A PES packet may carry a "Presentation Timestamp" (PTS) and a "Decoding Timestamp" (DTS) with it. The PTS indicates the time at which the data being carried should be presented, and the DTS provides information about the data decoding time. The "PTS_DTS_flag", which is likewise contained in the header of the PES packet, indicates whether the PES packet contains a PTS or a DTS. ISO/IEC Standard 13818-1 specifies an interval of at most 0.7 s between successive PTSs. The PTS may be evaluated in order to determine the current position, that is to say the current time code.

One problem that arises during the evaluation of the PTS is that the PTS need not start at zero in a video data stream, but may assume any (start) value. The individual frames in a video data stream are not coded precisely in the sequence in which they are displayed. To a limited extent, the PTS may thus also become smaller. Since the length of the PTS is limited, this may, however, also lead to "overflowing". Furthermore, the PTS may jump by a large amount at transition points between different video data stream elements which have been assembled in series. However, this PTS jump does not mean a jump in the time code for the video being played back. The problem that the first PTS in an MPEG2-TS data stream may not be zero can be solved as follows: a variable whose value is the time code, that is to say the play-back time which is elapsed, is set to zero in a Reset( ) call. This variable has the difference between two successive PTSs added to it successively. In order to ensure that the units for this value are milliseconds, the difference value is divided by 90. In the situation where the difference between two successive PTSs is greater than $FFFF_{hex}$, which corresponds to 0.7 s, the difference is ignored. This situation occurs when the transition point between two assembled stream elements is reached. When the parser comes across a PTS which is "spurious", the difference between it and the previous PTS and between it and the next PTS is ignored, since both values have a magnitude greater than 0.7 s.

The difference between two adjacent PTSs is included in the calculation of the time code only if it is not greater than $FFFF_{hex}$, which corresponds to 0.7 s. This calculation requires only the least significant 16 bits of the PTS, whose length is, however, 33 bits. However, since only 16 bits are required for calculation, and the comparison of two PTSs for the value $FFFF_{hex}$ can be carried out considerably more easily using 32 bits, the MSB (Most Significant Bit) in the PTS is in general ignored.

During forwarding or reversing, no video data for display is sent via an IEEE1394 bus, but only the position pointer is shifted in the video file. The speed at which the file pointer is moved is the speed of forwarding or reversing. For this purpose, the current time code is determined continuously, and may be displayed, for example, on a display module.

In order to allow a constant forwarding or reversing speed, which can be calculated, the file pointer is shifted at constant time intervals by steps of a specified time code. For this purpose, the data packets in the video stream which correspond to the sought time code have to be found. The basic procedure of the forwarding or reversing process is illustrated in Table 1.

TABLE 1

Basic procedure for forwarding and reversing

Repeat while the routine should not be left, and no errors have occurred
CurrentTimeCode = StreamParser.GetPosition( )
Determine the time code at the current position in the video stream
DistToMove = StreamParser.SeekTimeCode (CurrentTimeCode+ΔT)
Search the video stream for a packet with a time code which occurs at a specific time interval away from the current time code
File.Seek(DistToMove)
Move the position pointer to the new position in the video stream file
Wait for a specific time The forwarding and reversing speed can be set by means of the difference in the time code (CurrentTimeCode+ΔT) and the subsequent waiting time in the routine. The waiting time in the loop may be chosen without any restrictions. The difference in the time code ΔT is determined to match this waiting time, in order to achieve a specific forwarding or reversing speed.

The forwarding or reversing speed is the interval of the time code jumped over in a specific time. This could, for example, mean: 10 seconds of film should be jumped over in one second. The waiting time should not be excessively long since, otherwise, the time code display can be followed only at long intervals during forwarding or reversing. However, the waiting time must also not be so short that ΔT assumes a value which is shorter than the average interval between two time codes. Furthermore, the waiting time affects the legibility of the time display.

Since the time code at the current position in the video stream is required to be known during forwarding and reversing, the video data stream must be parsed continuously. In an MPEG2-TS data stream, this means that all the TSPs would have to be investigated. The PES packets would have to be determined, and investigated for the occurrence of a PTS. The PTS must be then be checked for errors and, if necessary, must be corrected. However, this process takes a long time so that forwarding and reversing cannot be carried out indefinitely quickly. However, forwarding and reversing are considerably simplified by the use of an information file according to the invention, which allows the current time code and the TSP containing it to be determined with little effort.

There is no need for every PES packet to contain a PTS. However, if it does contain a PTS, this PTS must be located at the start of the PES packet. Once a PTS has been found, a large number of TSPs can thus be skipped. However, during parsing of the video data stream the number of TSPs which can be jumped over is not known in advance. In this situation, the advantageous effect of the information file according to the invention can be used.

FIG. 2 illustrates an information file I according to the invention which, in principle, contains a sequence of offset values OP, OB which indicate how many elementary packets are not relevant and can be jumped over while forwarding and reversing. Additional information AI is also stored relating to each offset. Together, these three fields result in an information block IB for each PES packet PP. The values for "Offset Packets" OP and "Offset Bytes" OB indicate the number of elementary transport data packets (TSPs) TDP and the number of bytes between two relevant TSPs, that is to say between two packets PP#$1_1$, PP#$1_2$ in the transport data stream MTS which contain the headers $PPH_1$, $PPH_2$ of those PES packets PP which follow one another directly in the same elementary data stream EDS. Those TSPs which are associated with this respective PES packet PP are located between these relevant TSPs, but TSPs which are associated with the PES packets of different elementary data streams may also occur there. An information block IB comprises two offset values OP, OB and the additional information field AI. The additional information field AI relates to the respective packet PP#$1_1$, PP#$1_2$ in the data stream and may, for example, contain the timestamp (PTS) for this packet. Each information file relates to only one elementary data stream, preferably the video data stream, because the forwarding and reversing processes are intended to be oriented on this.

In the case of an MPEG2-TS data stream, the first two fields OP, OB in an information block indicate the interval between two successive PES packets, and each have a length of 32 bits. The "additional information" field AI in the described application contains for each video format the completely calculated and error-corrected time code, likewise with a length of 32 bits. An information block in the described form accordingly has a length of 3×32=96 bits or 12 bytes in an MPEG2-TS data stream. However, it may be advantageous to store further data in the additional information field AI, provided that this does not make the information file so long that the forwarding and reversing speed is reduced again. The information in the information file allows the application to skip all non-relevant TSPs immediately. The navigation or synchronization between the information file I and the elementary data stream EDS, for example a video data stream based on MPEG2, is carried out from PES packet to PES packet. The time code may in this case be read directly from the information file, and therefore needs not be recalculated during each forwarding or reversing process.

A recorded MPEG2-TS video data stream needs not start with a TSP which contains the start of a PES packet ("PES Start"). If, for example, the DSD is recording a live stream, then the first TSP is an undefined packet from a continuous transport data stream. This situation is illustrated in FIG. 3. The transport data stream MTS starts with two other data packets OTH before the first packet PSP#1 with a "PES Start" occurs. The first offset value OP1, OB1 in the information file describes the distance between the first MTS packet PSP#1 which contains a "PES Start" and the second MTS packet PSP#2 which likewise contains a "PES Start". The first TSPs in the transport data stream MTS do not contain a complete PES packet, and are ignored by the information file even if they are associated with the same elementary data stream. In addition, however, a first entry in the information file may also indicate the distance to the first PES packet PSP#1 or the number of the irrelevant TSPs OTH to be jumped over.

When the recording of a video stream ends, then the most recently received TSP need not contain the end of a PES packet. A further block is therefore attached to the last information block in an MPEG2-specific information file, whose "Offset Packets" value is zero, and this is then followed by the position of the last TSP which contains a "PES Start". This initial PES packet needs not be complete, and should not be sent during replay. In the shortened example shown in FIG. 3, the last regular information block OP2, OB2, TC2 describes the distance between the last complete PES packet which starts with PSP#2 and the incomplete last PES packet which starts with PSP#3. The offset OP2 is three, because the third subsequent TSP contains the next PES packet header PSP#3 associated with the same elementary data stream. The offset OB2 is the sum of the bytes in the PES packet which starts with PSP#2. The time code TC2 corresponds to the display time or the PTS of this PES packet. The most recent information block OP3, OB3, TC3, however, contains a zero for the offset value OP3, followed by the position of the last "PES Start" packet PSP#3. This therefore describes the end of the recorded elementary data stream.

A video data stream which is being scanned with the aid of an information file must first of all be synchronized with the information file. For this, it is necessary to look for the first TSP in the video data stream which contains the start of a PES packet, that is to say a "PES Start".

The information file is produced and evaluated in the format-specific DSD stream parser. It is therefore possible to produce a specifically adapted information file, with an individual additional information field and an individual bit length for the information block, for each video format.

The information file is normally created during reception of the video data, that is to say during the recording process. If no information file exists for an already existing track, an information file such as this can be produced when the DSD application is started. It is thus also possible to replay video files for which no information file according to the invention has been produced during recording, for example when a video file has been copied manually. The information file may also be transmitted and received together with the video data.

The functions listed in Table 2 are defined in the DSD stream parser module in order to provide the interface, and allow an information file to be opened, produced or closed.

TABLE 2

| Functions of the DSD stream parser | |
|---|---|
| OpenInfoFile( ) | Opens an information file for reading |
| CreateInfoFile( ) | Produces an information file, and opens it for writing |
| CloseInfoFile( ) | Closes an information file |
| ParsePacket( ) | Scans a video data packet with the aid of an information file that has been opened for reading |
| ParseStream( ) | Scans a video data stream. If an information file has been opened by means of OpenInfoFile( ) for reading, this is used for parsing. If a previous call has been made to CreateInfoFile( ), the information file is produced on the basis of the present video data stream |
| GetCurrentEnd-OfValidStream( ) | Returns the position of the last associated (valid) part of a video data stream after the last call by ParseStream( ). This is important, for example, at the end of an MPEG2-TS data stream which does not end with a complete PES packet |
| GetStartOf- | Returns the position of the first |

TABLE 2-continued

Functions of the DSD stream parser

| | |
|---|---|
| StreamOffset( ) | valid part of the video data stream. This is important when recording starts in the middle of a continuous video data stream. Returns the position of the first TSP which contains a "PES Start" in the case of an MPEG2-TS data stream |
| ResetInfo FilePosition( ) | Resets the file pointer within the information file to the file start |
| SeekTimeCode( ) | Searches for a specific time code in the information file, and returns the number of bytes which have to be jumped over in the video data stream in order to reach the location of the time code being looked for |
| CheckSync( ) | Investigates whether a video data stream is synchronized to the information file |
| EndOfInfoFile( ) | Checks whether the end of the information file has been reached |

A call of Parse Packet( ) reads an information file, and a call of Parse Stream( ) reads or produces an information file, depending on a previous function call of OpenInfoFile( ) or CreateInfoFile( ).

The function CheckSync( ) checks whether the video data stream and the information file are synchronized. In the case of an MPEG2-TS data stream, a check is carried out to determine whether the "payload_unit_start_indicator" flag at the current position in the video stream is set to 1, and whether the "start_code_prefix" contains the value $000001_{hex}$. If this is the case, the TSP contains the start of a PES packet at the current location in the video stream. Since the information file indicates the interval between two TSPs which each contain adjacent "PES Start", this is the necessary condition for the scanning of the video data stream with the aid of the information file. In this case, the function returns the value "true".

A call of ParsePacket( ) scans a single TSP in an MPEG2-TS data stream. Successive calls of ParsePacket( ) contain successive TSPs as input parameters. The time code for the packet currently being parsed is read from the associated information file. A previous call of OpenInfoFile( ) is therefore necessary. FIG. 4 shows the procedure in the ParsePacket( ) routine.

A video data stream to be parsed is first of all synchronized to the information file in individual calls of ParsePacket( ) by searching for the first TSP in the video data stream which contains a "PES Start". The first byte of a TSP header, the sync_byte, is investigated for the specified value $47_{hex}$ in the first step D1, for this purpose. The module variable bFirstPESReached indicates whether this TSP has already been found. In the second step D2, ParsePacket( ) investigates this variable. If the TSP has not already been found, then a call of CheckSync( ) is made. The value of bFirstPESReached can be set to "true" depending on the value that is returned. In the third step D3, this variable is used to once again check whether a first TSP with the start of a PES packet has been found. If the video data stream has been synchronized to the information file in a call of ParsePacket( ), the offset relating to the next TSP which contains a relevant "PES Start" is read from the info file. The module variable u32PacketsToNextPES is given the value of the determined offset. When a new function call is made, the variable is decremented. The information file is then not read again until the variable has reached the value zero. If an offset of zero is read D4,D5 from the information file, that is to say the file end has been reached, the position of the last TSP which contains a "PES Start" is transferred to the module variable u64ByteCounterAtPESStart. The value of this variable is returned by the function GetCurrentEndOfValidStream( ). If the file end has not been reached, the time code associated with the current TSP is read from the information file, and is stored in the module variable u32ElapsedTime.

The function ParseStream( ) scans a part of a video data stream comprising one or more TSPs. It supports not only the determination of the time code from an information file, but also the production of such a file. The mode that is used depends on a previous call of OpenInfoFile( ) or CreateInfoFile( ). A single video data packet is in each case extracted from the video data stream to be parsed, in a loop. The loop is continued until each packet has been passed through. The module variable u32TSPCounter in the process counts the extracted packets, and the extracted bytes are counted in u64ByteCounter. In the event of a previous call of OpenInfoFile( ), the respectively extracted packet is used as an input parameter for a function call of ParsePacket( ). As soon as the first TSP with a "PES Start" has been reached, the current number of bytes contained in u64ByteCounter is transferred to the module variable u32CurrentStartOfStreamOffset.

When an information file is intended to be produced, the current TSP is transferred to the private function ParseTransportPacket( ). This function determines whether the TSP is relevant for the elementary data stream, extracts a piece of PES packet from this, and stores it in a buffer. With each function call, a further piece of PES packet is stored in a buffer. If the TSP contains the start of a new PES packet, the count of the variable u32TSPCounter is stored in the module variable u32TSPCounterAtPESStart, and the current value of u64ByteCounter is stored in u64ByteCounterAtPESStart, all the previously stored pieces of the PES packet are joined together, and the entire PES packet is investigated by the private function ParsePESPacket( ). This function determines the associated PTS, if present, and stores this in the module variable u32PTS. It is also possible to investigate PES packets further, for example to determine whether they contain video or audio data streams. The PTS is then investigated in ParseTransportPacket( ), is checked for errors and is corrected, and the current time code is calculated, and is written to the open information file. The time code is calculated using the method described above. The distance between two adjacent TSPs which contain a "PES Start" is calculated using the module variables u32TSPCounter, u32TSPCounterAtPESStart, u64ByteCounter and u64ByteCounterAtPESStart.

The function GetCurrentEndOfValidStream( ) returns the current value of the variable u64ByteCounterAtPESStart, as described for ParsePacket( ) and ParseStream( ). It thus provides the position of the most recently parsed TSP which contains a "PES Start".

The function GetStartOfStreamOffset( ) returns the value of the variable u32CurrentStartOfStreamOffset filled in ParseStream( ). If the application is replaying a video stream, the actual transmission is started from the returned value. This prevents an incomplete PES packet from being transferred at the start of replay. Since a video data stream can be recorded starting at any point, the recorded file need not start with a "PES Start" in the first TSP. The variable u32CurrentStartOfStreamOffset is initially set to the initial value $FFFFFFFF_{hex}$. If this value is returned by the function, this means that no "PES Start" has yet been found in ParseStream( ).

The search for a specific time code in the information file is carried out using the SeekTimeCode( ) routine of the DSD-MPEG2 parser. A distinction is drawn between forward and reverse search (SeekType). The number of bytes through which the file pointer must be moved in the video stream in order to reach the appropriate TSP is returned. In the reverse searching path of the routine, a time code which is less than or equal to the time code transferred as a parameter is looked for in the information file. The algorithm described in Table 3 is carried out for this purpose.

TABLE 3

Structogram for reverse searching using SeekTimeCode( )

| | |
|---|---|
| Initialize the total jump counter to zero | 1. |
| Read the time code associated with the current packet | 2. |
| Repeat while the currently read time code in the information file is greater than that being looked for, the start of the information file has not been reached, and no errors have occurred: | 3. |
| determine the number of bytes from the current position in the video stream to the previous packet | 4. |
| determine the time code associated with the previous packet | 5. |
| set the file pointer in the information file to the start of the previous information block | 6. |
| add the number of bytes read in 4. to the total jump counter | 7. |
| Return the value of the total jump counter | 8. |

The total jump counter in Table 3 indicates the number of bytes through which the position pointer must be moved in the video stream in order to reach the desired time code. This is looked for in the information file by adding up the offsets from PES packet to PES packet.

In the forward path of the routine, a time code is looked for in the information file which is greater than or equal to the time code transferred as a parameter. Table 4 illustrates the structogram for forward searching.

TABLE 4

Structogram for forward searching using SeekTimeCode( )

| | | |
|---|---|---|
| Initialize the total jump counter to zero | | 1. |
| Read the time code associated with the current packet | | 2. |
| Jump in the information file to the start of the next information block (new position) | | 3. |
| Repeat while the currently read time code in the information file is smaller than that being looked for, the start of the information file has not been reached, and no errors have occurred: | | 4. |
| read the "Offset Packets" field in the information block at the current location in the information file | | 5. |
| is the "Offset Packets" field that has been read zero, and is the next PES packet in the video stream thus incomplete (file end)? | | |
| YES | NO | |
| Set the file pointer for the information file to the start of the file; end the loop | Determine the number of bytes between the original PES packet and the current PES packet in the video stream | 6. |
| | Add the number of bytes determined in 6. to the total jump counter | 7. |
| | Determine the time code associated with the current packet | 8. |
| Return the value of the total jump counter | | 9. |

After each run through the loop for the algorithm shown in Table 4, the file pointer for the information file points to the start of the next information block, for which steps 5 to 8 are carried out. On reaching the file end, the loop is left, and the file pointer in the information file is set to "file start".

The following text describes the conversion of forward and reverse commands to forwarding and reversing.

Forwarding and reversing in a video data stream is performed using the information file described above. At the start of the routine, it is assumed that the position pointer within the video stream is pointing at a TSP which contains the start of a PES packet ("PES Start"), or at a TSP which is located in front of this. For synchronization with the information file, the video stream is scanned forwards until a TSP with a "PES Start" has been found. In FIG. 3, the packets OTH in the data stream TS are scanned until the first PES packet PSP#1 which contains a "PES Start" has been found. Then a time code in the information file which is at a specific time interval from the current time code is searched for by means of a loop using SeekTimeCode( ), and the number of TSPs or bytes to be jumped over is determined by adding them up. The data pointer is offset in the video stream by this amount.

Synchronization between the video stream and the information file must also be ensured when a command change occurs. For this purpose, the time code is likewise read from the information file rather than from the video stream during the replay process. There are two reasons for this: firstly, the time code then needs not be recalculated from the PTS, so that this is faster and has an advantageous effect on performance, and secondly the information file is in consequence synchronized to the video stream in the event of possible command change after forwarding or reversing.

In order to keep the video stream and the information file synchronized even when a command change occurs, the DSD-MPEG2 parser complies with the following rules:

1. At the start of carrying out a command, the position pointer must point in the video stream at the TSP which contains the start of the PES packet associated with the current pointer position in the information file, or at a TSP which is located in front of it. If the pointer is located at the file start both in the video stream and in the information file, this condition is therefore satisfied by definition.

2. If the position pointer in the video stream is not located at a TSP with a "PES Start" after the replay process, then the file pointer for the information file points at the information block which is associated with the next TSP with a "PES Start". If the current TSP in the video stream contains a "PES Start", then the file pointer for the information file points at the information block associated with this TSP.

3. After carrying out a forward or reverse command, the position pointer in the video stream points to a TSP with a "PES Start". The file pointer for the information file points at the information block associated with this TSP. One exception is the situation of the file end being reached while carrying out the command. In this case, both pointers are set to the file start.

After carrying out a command, both the video file and the information file are closed. Module variables are therefore introduced which permanently store the current position in the video stream and in the information file. The DSD working thread module creates the variable u64FilePos for this purpose, which is updated with the current position of the file pointer for the video file after each file access. The DSD-MPEG2 parser defines the variable u32InfoFilePosition. In the StartFile( ) routine of the DSD working-thread, the file pointer is set to the position in u64FilePos after opening the video file. This is also done on opening the information file with the corresponding DSD-MPEG2 parser module variables. If a track other than that selected by the previous command is being replayed, both module variables must be set to zero.

In practical implementations, the following magnitude ratios between the files can typically be achieved, by way of example:

For a video file with a size of 65 Mbytes, the information file has a size of about 81 Kbytes, corresponding to 0.12%. For another video file whose size is 229 Mbytes, the information file size is about 146 Kbytes, corresponding to about 0.06%.

The transport data stream (Transport Stream, TS) used is a packet-oriented data stream which is used predominantly for channels subject to errors, usually for transmission or storage. However, the invention is not dependent on whether all or only some of the packets in the transport data stream have any relevance at all.

The PES packets that are used have a variable size of up to 64 Kbytes, and may contain an intracoded frame ("I-frame", approx. 40 Kbytes) or up to two interceded frames ("B-frame", "P-frame") in the video elementary data stream. This is because the size of the coded frames is variable, depending on the frame content. The method according to the invention thus allows individual PES packets, and thus individual video frames, to be found simply, quickly and specifically.

One important feature of the invention is that the information relating to the finding of the PES packets is stored separately, for example in a separate file or in a separate memory area. A further advantage of the method according to the invention is that there is no need to first of all sort during the location process the stored transport data stream containing packets from two or more elementary data streams in order to locate a specific point within a particular elementary data stream. Both lead to the possibility of the transport data stream being stored without being changed, as it was received.

Furthermore, the method according to the invention makes it possible to jump to any entry point in the video file which is possible from the frame coding point of view, that is to say to any I-frame, instead of, for example, having to preset a fixed framework of possible entry points. Even interceded frames, B-frames or P-frames, can be jumped to, provided that they are located at the start of a PES packet. These points are located automatically when the information file is created.

The indication of relative offsets means that the method is independent of the length of the overall file. Only the maximum jump width is limited, although it can be predicted reliably. In this case, the offset with respect to the next relevant TSP or the previous relevant TSP can be indicated, depending on the definition of the association.

The method according to the invention can advantageously be used in appliances which have to navigate in packet-oriented data streams, for example recording and replay appliances for video and/or audio data, such as personal video recorders (PVRs) or similar appliances, in particular for implementation of forwarding, reversing or replay function.

What is claimed is:

1. A method for scanning a first digital data stream of time-sensitive video or audio data being composed of data packets of a first type, the data packets of the first type being packed into data packets of a second type forming a second digital data stream, wherein the data packets of the first type have individual different sizes and are larger than the data packets of the second type, and wherein the data packets of the second type have constant size, the method comprising steps of:

reading, by a device for reading digital video or audio data, or receiving, by a device for storing or recording digital video or audio data, the second digital data stream;

reading or receiving an information file (I) containing navigation information;

determining the start position of a first data packet of the first type within the second data stream;

retrieving from the information file start positions of the data packets of the first type and additional information relating to the data packets of the first type, wherein the start position of a particular one of the data packets of the first type is relative to the start position of the next or previous data packet of the first type within said second data stream and comprises at least a number of data packets of the second type or a number of bytes, and wherein the additional information relating to a data packet of the first type comprises a time code corresponding to said particular data packet of the first type;

controlling a device to scan the first data stream, based on said start position of the first data packet of the first type and on said retrieved start positions; and scanning the first data stream, wherein data packets of the second type or bytes within a data packet of the second type are skipped according to said retrieved number of data packets or number of bytes.

2. A method according to claim 1, wherein the second data stream and the information file are recorded and said scanning comprises forwarding and reversing between the data packets of the first type.

3. A method according to claim 1, wherein said scanning starts from the beginning of the second data stream and is performed between successive data packets of the first type.

4. A method according to claim 1, wherein a position pointer points at the start of a data packet of the first type, and said scanning comprises moving the position pointer among starts of successive data packets of the first type according to said number of data packets of the second type or said number of bytes.

5. A method according to claim 1, wherein the data packets of the first type include time stamps, and wherein said time code is calculated from the time stamps of a plurality of data packets of the first type.

6. A method according to claim 1, wherein said scanning is performed according to commands for forwarding and reversing.

7. A method according to claim 6, wherein a position pointer points at the start of a current data packet of the first type, further comprising the step of displaying the time code of the current data packet of the first type on a display.

8. A method according to claim 1, wherein further data packets of the second type forming said second data stream comprise parts of one or more other data streams being composed of data packets of the first type, and wherein the data packets of the first type are associated to their respective data stream according to a stream identifier which they comprise, and wherein said information file refers only to start positions of data packets of first data stream.

9. An apparatus for scanning a first digital data stream of time-sensitive video or audio data being composed of data packets of a first type, the data packets of the first type being packed into data packets of a second type forming a second digital data stream, wherein the data packets of the first type have individual different sizes and are larger than the data packets of the second type, and wherein the data packets of the second type have constant size, the apparatus comprising:

means for reading, by a device for reading digital video or audio data, or receiving, by a device for storing or recording digital video or audio data, the second digital data stream;

means for reading or receiving an information file containing navigation information;

means for determining the start position of a first data packet of the first type within the second data stream;

means for retrieving from the information file start positions of the data packets of the first type and additional information relating to the data packets of the first type, wherein the start position of a particular one of the data packets of the first type is relative to the start position of the next or previous data packet of the first type within said second data stream and comprises at least a number of data packets of the second type or a number of bytes, and wherein the additional information relating to a data packet of the first type comprises a time code corresponding to said particular data packet of the first type;

means for controlling a device to scan the first data stream; and means for scanning the first data stream based on said start position of the first data packet of the first type and on said retrieved start positions, wherein data packets of the second type or bytes within a data packet of the second type are skipped according to said retrieved number of data packets or number of bytes.

10. An apparatus according to claim 9, wherein the second data stream and the information file are recorded and said means for scanning performs forwarding and reversing between the data packets of the first type.

11. An apparatus according to claim 9, wherein said means for scanning performs a scanning operation between successive data packets of the first type, starting from the beginning of the second data stream.

12. An apparatus according to claim 9, further comprising a position pointer, wherein the position pointer points at the start of a data packet of the first type, and said means for scanning moves the position pointer among staffs of successive data packets of the first type according to said number of data packets of the second type or said number of bytes.

13. An apparatus according to claim 9, wherein the data packets of the first type include time stamps, further comprising means for calculating said time code from the time stamps of a plurality of data packets of the first type.

14. An apparatus according to claim 9, further comprising means for receiving forward and reverse commands, wherein said means for scanning operates according to the forward and reverse commands.

15. An apparatus according to claim 14, wherein a position pointer points at the start of a current data packet of the first type, further comprising means for displaying the time code of the current second data packet on a display module.

16. An apparatus according to claim 9, wherein further data packets of the second type forming said second data stream comprise parts of one or more other data streams being composed of data packets of the first type, and wherein the data packets of the first type are associated to their respective data stream according to a stream identifier which they comprise, and wherein said information file refers only to start positions of data packets of first data stream.

* * * * *

UNITED STATES PATENT AND TRADEMARK OFFICE
CERTIFICATE OF CORRECTION

| | |
|---|---|
| PATENT NO. | : 7,664,105 B2 |
| APPLICATION NO. | : 10/988803 |
| DATED | : February 16, 2010 |
| INVENTOR(S) | : Friedemann Hübler |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Thirtieth Day of November, 2010

David J. Kappos
*Director of the United States Patent and Trademark Office*